United States Patent [19]
Nordstrom

[11] 3,986,254
[45] Oct. 19, 1976

[54] ENCASED STRAIN GAUGE

[75] Inventor: Kjell Nordstrom, Vasteras, Sweden

[73] Assignee: Consearch AB, Vasteras, Sweden

[22] Filed: Oct. 9, 1974

[21] Appl. No.: 513,347

[52] U.S. Cl. .................. 29/613; 338/2; 73/88.5 R; 33/DIG. 13
[51] Int. Cl.[2] .................................. H01C 17/02
[58] Field of Search ............. 29/613; 140/71 A; 73/88.5; 338/2, 6; 33/DIG. 13

[56] References Cited
UNITED STATES PATENTS

| 2,722,587 | 11/1955 | Buzzetti et al. | 338/2 |
|---|---|---|---|
| 2,982,127 | 5/1961 | Scott | 73/88.5 |
| 3,092,993 | 6/1963 | Russell | 73/88.5 |
| 3,184,962 | 5/1965 | Gay | 73/88.5 |
| 3,853,000 | 12/1974 | Barnett et al. | 73/88.5 |

*Primary Examiner*—Lowell A. Larson

[57] ABSTRACT

A preassembled strain gauge unit includes a housing having a resilient material therein. At least one strain sensing element is connected to the resilient material. Installation of the strain gauge unit is accomplished by applying adhesive to the strain sensing element and then fastening the housing to a surface with the adhesive between the surface and the strain sensing element. The resilient material is particularly designed to function as a spring during the adhesive curing period to apply a force to the strain sensing element during such adhesive curing period. In addition, the resilient material provides a seal for minimizing contact of moisture and air with the strain sensing element.

15 Claims, 8 Drawing Figures

U.S. Patent        Oct. 19, 1976        3,986,254
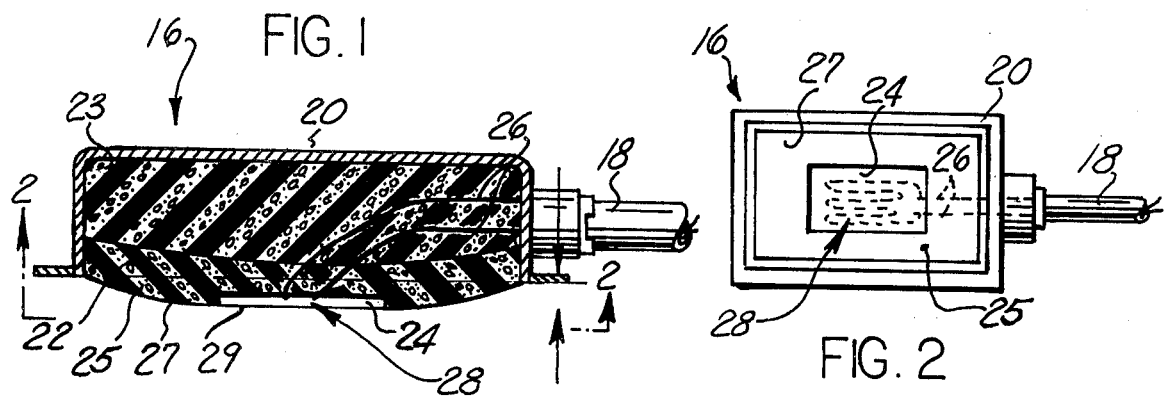
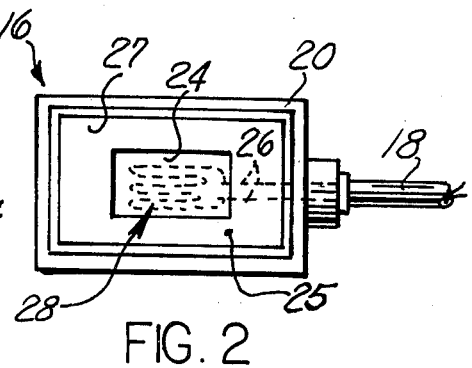
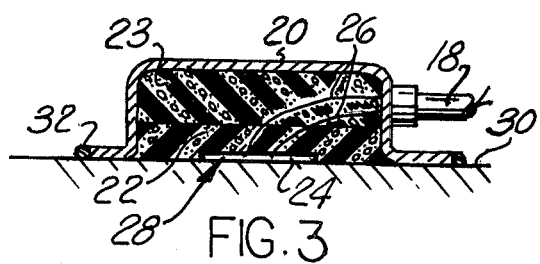
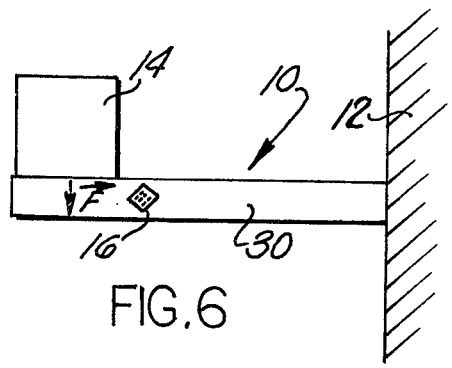
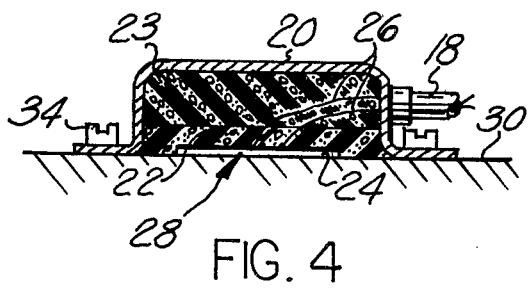
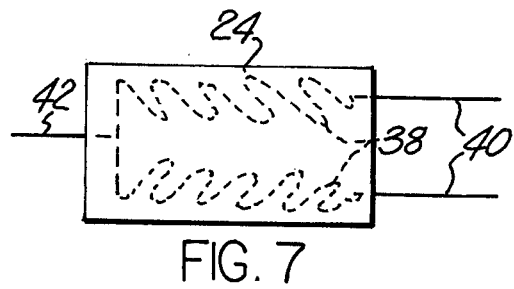
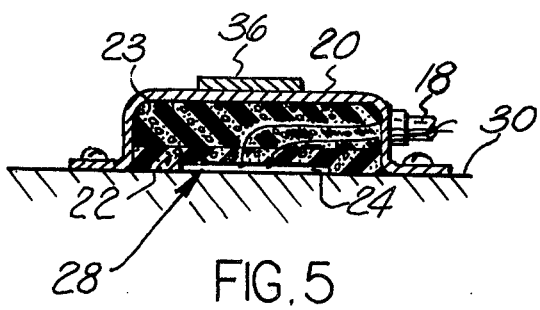
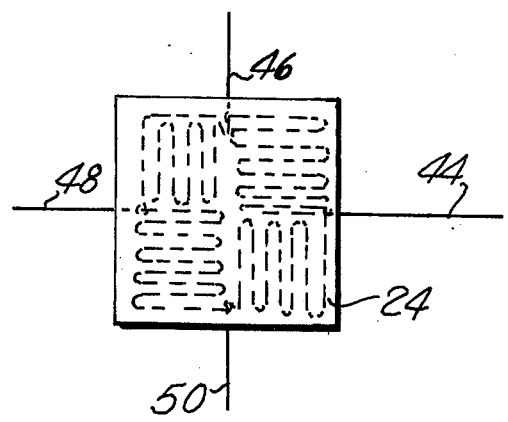

ENCASED STRAIN GAUGE

BACKGROUND AND SUMMARY OF THE INVENTION

The present invention constitutes an improvement in the strain gauge art. As is known, strain gauges are used for measuring strains in structures of all types. For example, strain gauges are used as transducers in weighing systems or in numerous other well-known strain measuring systems.

The most significant problem today relating to the strain gauge art is the time-consuming and critical application of the strain gauge to the structure whose strain is to be measured. Strain gauges generally include a metal or the like deposited on a film of bakelite or the like. The metal deposit includes a metal element to which electrical leads are soldered.

A typical way in which strain gauges are applied to a member whose strain is to be measured involves cleaning a surface of the member and then adhesively applying a strain gauge to the member. To completely adhesively secure all parts of the strain gauge to the member, pressure is applied to the strain gauge and preferably throughout its surface area to secure all of the surface area of the strain gauge to the member. After the strain gauge has been adhesively secured to the member, suitable electrical leads are connected to the metal element and the electrical leads and strain gauges are then sealed by suitable moisture and air protective material which is attached to the member and surrounds the strain gauge. Since the strain gauge is extremely small, as are the leads, delicate handling is necessary. Also, it is important that the gauge is adhered throughout to the surface of the member.

The present invention specifically provides for an improvement in the application of a strain gauge to a structure whose strain is to be measured. The present invention minimizes the time-consuming, delicate and critical application of the strain gauge to the member.

In general, the present invention solves the aforementioned problem by providing a preassembled strain gauge structure. In accordance with the present invention, the structure includes a strain gauge fixedly secured in a housing and connected with electrical connections which extend through the housing. In order to apply the structure to a member whose strain is to be measured, all that it is necessary to do is to apply adhesive to the strain gauge and fasten the housing unit to the member whose strain is to be measured. Accordingly, the time-consuming problem of separately securing the strain gauge to the member, allowing the adhesive to cure, and then applying the electrical connections to the strain gauge and subsequently enclosing the strain gauge and electrical connections in moisture-tight material are eliminated. In fact, in accordance with the present invention, a strain gauge is applied in, what could be termed, a one-step procedure, namely, the step of applying a preassembled strain gauge unit to the member whose strain is to be measured.

To applicant's knowledge, no one has developed a preassembled strain gauge structure which may be applied as a unit to a member whose strain is to be measured. Applicant, however, recognizes that there are strain gauge probes, such as disclosed in U.S. Pat. No. 3,416,012, which for test purposes are manually applied and manually maintained in engagement with a strain structure during the strain measuring period, and thereafter are removed therefrom. Such structures measure a change in length between two discrete points, and are for individual test purposes and are not unitized with the structure being tested and used for testing over long periods of time as a permanent part of an installed strain measuring system, such as for weighing systems, etc. Applicant further recognizes that there are certain structures which apply a biasing force to a strain sensing element after the strain sensing element is applied to the member whose strain is to be measured. A typical example of such is shown in U.S. Pat. No. 3,433,699. However, to applicant's knowledge, no one has previously developed or even suggested a strain gauge structure for permanent or semipermanent installation and which is preassembled and which may be applied to the member whose strain is to be measured in the simplified and time-shortened manner of the present invention.

DESCRIPTION OF THE DRAWINGS

Other advantages of the present invention will become apparent from the following description made with reference to the accompanying drawings wherein;

FIG. 1 is a sectional view of a strain gauge unit constructed in accordance with the present invention and prior to application thereof to a member whose strain is to be measured;

FIG. 2 is a bottom plan view, reduced in size, of the strain gauge unit of FIG. 1 taken approximately along the line 2—2 of FIG. 1;

FIGS. 3, 4 and 5 are sectional schematic views disclosing various ways of mounting the strain gauge unit of the present invention to a member whose strain is to be measured;

FIG. 6 is a view showing schematically a use for a strain gauge unit in accordance with the present invention; and FIGS. 7 and 8 disclose alternative gauge configurations for the strain gauge unit in accordance with the present invention.

DETAILED DESCRIPTION OF AN EMBODIMENT OF THE PRESENT INVENTION.

As stated above, the present invention relates to improvements in the strain gauge art, and particularly provides for a simple permanent or semipermanent installation of a strain gauge to a member whose strain is to be measured. The present invention substantially minimizes the time for applying the strain gauge and simplifies such application. The present invention is applicable to any system which includes strain gauges, and FIG. 6, by way of example, illustrates schematically the invention applied to a system for determining the weight of an object 14.

The system of FIG. 6 includes a cantilever beam 10 supported from a support 12. A strain gauge unit 16 is connected to beam 10 and is operative to sense shear strains which are introduced into the beam 10 by external forces applied to the beam. The unit 16, of course, does not have any appreciable effect on the bending property of the beam 10. The member 14, or any other force-applying means whose weight is desired to be measured, is applied to the beam 10 and is thus effective to apply a force $\bar{F}$ to the beam in the direction shown in FIG. 6. The gauge unit 16 includes a strain sensing transducer 24 forming a part of a conventional bridge circuit, and suitable integrating means (not shown) are provided to transform the sensed strain into a measurement of the applied force F.

The strain gauge unit 16 is constructed in accordance with the present invention and comprises a unit which is completely preassembled prior to application of the strain gauge unit 16 to the member 10. Since the unit 16 is preassembled, it is applied to the member 10 in, what might be termed, a one-step process, namely, the step of securing the preassembled unit in place on the member 10.

As shown in FIG. 1, the preassembled strain gauge unit 16 includes a metal housing 20 having compressive material 23 completely contained therein. The compressive material 23 is preferably formed of foam rubber, but may also comprise similar types of material. Also contained within housing 20 is resilient material 22 which is preferably formed of silicon rubber, and which also may be formed of similar types of resilient material.

As seen in FIG. 1, in the preassembled state of the strain gauge unit, resilient material 22 includes a portion 25 which extends out of the housing 20 and which includes outer surface 27. Outer surface 27 is formed with a recess 28 whose depth is shallow enough so that it is located totally outside of the housing 20. Portion 25 is preferably bowed outwardly in the manner shown in FIG. 1. The borders of recess 28 are such that the recess 28 is located in the geometrical center of the outer surface 27, as shown in FIG. 2.

One or more strain sensing elements 24 are connected to the resilient material 22 in a suitable manner. The strain sensing element 24 comprises a metal deposit on a Mylar (or the like) film. In FIG. 1, the strain sensing element 24 has electrical connections 26 connected thereto and preferably to a metal element forming a part thereof. The electrical connections 26 extend through the materials 22 and 23 and through insulating cable 18, and serve to connect element 24 in a conventional bridge circuit, as is known. Element 24 is located within the recess 28 in the outwardly extending portion 25 of the material 22 and includes a substantially flat outer contact surface 29, which surface is substantially contiguous with surface 27 of portion 25.

As seen by FIG. 1, the combined materials 23 and 22 are effective to substantially fill the housing and are effective to seal the element 24 and connections 26 from moisture and air. This is particularly significant, since ambient conditions can affect the element 24 and electrical connections 26 and produce error signals.

For purposes of explanation, assume that the preformed strain gauge unit 16 is to be applied to a surface 30 of beam 10. The initial step involves cleaning or grinding of the surface 30. Suitable adhesive is applied to the surface 29 of element 24. Adhesive may be applied to the surface 27 of resilient material 25, but such is not necessary. The strain gauge unit 16 is then positioned upon the surface 30 and forced thereagainst, and the housing 20 is then mechanically fastened thereto. The effect of the housing is negligible on the member being measured, of course, unless the member is thin.

FIGS. 3 and 5 illustrate three suitable forms of mechanical fastening means for securing the unit 16 to the surface 30. Such means might include tack welds 32 (FIG. 3), screws 34 (FIG. 4), or a strap 36 (FIG. 5). Of course, numerous other conventional mechanical fastening means may be readily used to fasten the strain gauge unit 16 to the surface 30. When the unit 16 is secured to the surface 30, the compressive materials 22, 23 continuously apply a force to the strain gauge 24 during the adhesive curing period as well as thereafter. This assures the complete and uniform adhesion of the strain gauge 24 to the surface 30, and minimizes the possibility of unattached portions of the gauge 24.

Also, because of the surface area contact between the surface 27 and the surface 30, a seal is produced therebetween which minimizes the possibility of air or moisture coming in contact with the element 24. Obviously, continuous weld connections, such as 32, around the housing would enhance that seal, and in fact a hermetic seal may be provided.

The unit 16 may be made by different processes, for example, by molding the materials 22, 23 in the housing 26 with the strain sensing element 24 and electrical connections 26 in position. Such molding of the materials 22, 23 with elements 24, 26 in position could provide a seal therebetween. Additionally, for example, it is contemplated that the materials 22, 23 could be preformed and then assembled with the other elements.

In FIGS. 1 and 2 the strain sensing element 24 is formed as a single resistance element for a bridge circuit. As shown in FIGS. 7 and 8, the strain sensing element 24 may also include a half bridge (FIG. 7) or a full bridge (FIG. 8) configuration, if desired.

As may be readily appreciated from the above description, a strain gauge unit according to the present invention provides numerous advantages. Not only are the element 24 and the electrical connections 26 sealed within the housing structure 20, but also the combined effect of the mechanical seal on housing 20, the adhesive mounting of the strain sensing element 24 to the specimen surface, and the internal spring effect of the resilient material 22 serve to further effectively seal the strain gauge element 24 from ambient conditions, thus reducing the likelihood of error signals being introduced into the strain sensing system. The bowed-out design of the resilient material 22 provides pressure where it is most needed, i.e., at the location of the element 24 which is remote from the portions of the housing to which the mechanical fastening means are applied.

From the above, it should be clear that the strain gauge unit 16 provides a substantial improvement in the installation of strain gauges to a member whose strain is to be measured. As noted above, previous techniques for applying strain gauges to a member whose strain is to be measured have involved substantial and delicate handling. Through the use of the present invention, the steps of installation are substantially minimized and the time involved is substantially reduced. In effect, the present invention can be characterized as a one-step installation procedure, the one step being the assembly of the preformed strain gauge unit 16 to the surface of the member whose strain is to be measured.

Having described my invention, I claim:

1. A method of non-removably applying one or more strain sensing elements to a member whose strain is to be measured, said method comprising the steps of preassembling a strain gauge unit having a housing and a resilient material within the housing which supports at least one strain sensing element having electrical leads connected thereto, applying an adhesive to said strain sensing element, applying said preassembled strain gauge unit to said member with said adhesive on said strain sensing element contacting said member, and fastening said housing to said member.

2. A method as defined in claim 1 including the step of applying a force to the strain sensing element to hold the strain sensing element in substantially tight, continuous engagement with the member during curing of the adhesive.

3. A method as defined in claim 2 including the step of compressing the resilient material during application of the preassembled strain gauge unit to the member and holding the resilient material in compression so that the resilient material applies the force to the strain sensing element for holding the strain sensing element in tight, continuous engagement with the member during curing of the adhesive.

4. A method as defined in claim 1 wherein the step of preassembling the strain gauge unit includes the step of hermetically sealing the electrical leads within the housing and the resilient material.

5. A method as defined in claim 1 wherein the step of preassembling the strain gauge unit includes the step of molding resilient material within the housing and about the electrical leads.

6. A method of non-removably applying one or more strain sensing elements to a member whose strain is to be measured, said method comprising the steps of preassembling a strain gauge unit having a housing which supports at least one strain sensing element of the type comprising a metallic strain sensing member connected to a film of material and having electrical leads connected to the strain sensing element, applying an adhesive to said strain sensing element, applying said preassembled strain gauge unit to said member with said adhesive on said strain sensing element contacting said member, and fastening said housing to said member.

7. Apparatus comprising a strain gauge unit for connection to a member whose strain is to be measured, said strain gauge unit comprising a preassembled structure including a housing having an opening, a mass of resilient material disposed at least partially within the housing and including at least a portion disposed in the opening in the housing, at least one strain sensing element connected to said portion of said resilient material disposed in the opening in the housing, adhesive means applied to said strain sensing sensing element for securing said strain sensing element to the member, and means for fastening said housing to the member with the opening in the housing disposed in facing relationship to the member.

8. Apparatus as set forth in claim 7 wherein said portion of said resilient material also projects outwardly from said opening in the housing, said means for fastening said housing to said member comprising means effective to compress said resilient material to a substantially flat condition.

9. Apparatus as set forth in claim 8 and further including electrical leads extending through said resilient material and connected to part of said strain sensing element.

10. Apparatus as set forth in claim 8 wherein the portion of the resilient material which projects outwardly of the housing includes a surface which defines a recess, said strain sensing element being connected to the said surface and located within said recess.

11. Apparatus as set forth in claim 8 wherein said resilient material disposed within the housing fills a portion of said housing, and further including a compressible material filling the rest of said housing.

12. Apparatus as set forth in claim 11 wherein said resilient material comprises silicon rubber and said compressible material comprises foam rubber.

13. Apparatus as set forth in claim 7 including mechanical means for fastening said housing to the member.

14. Apparatus comprising a strain gauge unit for connection to a member whose strain is to be measured, said strain gauge unit comprising a preassembled structure including a housing having an opening, a mass of resilient material disposed at least partially within the housing and including at least a portion disposed in the opening in the housing, at least one strain sensing element connected to said portion of said resilient material disposed in the opening in the housing, said strain sensing element being of the type comprising an insulating film carrying a resistance element and intended to be gluded to a member, and means for fastening said housing to the member with the opening in the housing disposed in facing relationship to the member.

15. Apparatus as set forth in claim 14 including electrical leads disposed within said housing and connected to said strain sensing element, said housing and said mass of said resilient material being disposed to substantially seal the resistance element and said electrical leads from ambient conditions when the preassembled structure is applied to a member.

* * * * *

UNITED STATES PATENT OFFICE
CERTIFICATE OF CORRECTION

Patent No. 3,986,254      Dated  October 19, 1976

Inventor(s)  Kjell Nordstrom

It is certified that error appears in the above-identified patent and that said Letters Patent are hereby corrected as shown below:

Column 5, line 46 delete "sensing" second occurrence.

Column 6, line 39 change "gluded" to --glued--.

Signed and Sealed this

Eleventh Day of January 1977

[SEAL]

Attest:

RUTH C. MASON
*Attesting Officer*

C. MARSHALL DANN
*Commissioner of Patents and Trademarks*